Feb. 10, 1931.   J. J. A. MILLER   1,791,631
COMBINED CLAMP AND HOOK FOR CABLES AND ROPES
Filed Feb. 8, 1930
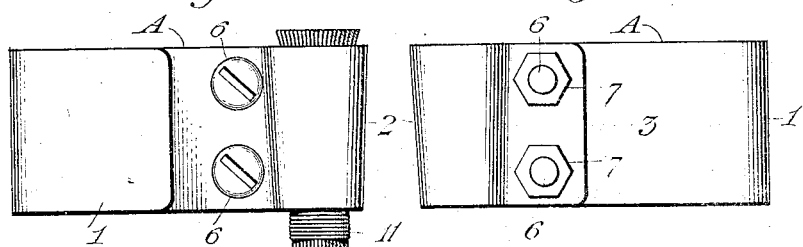
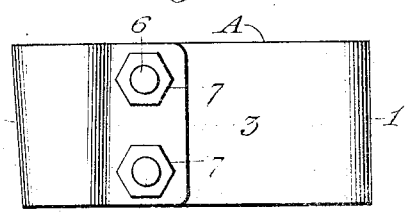
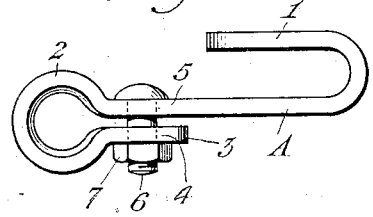
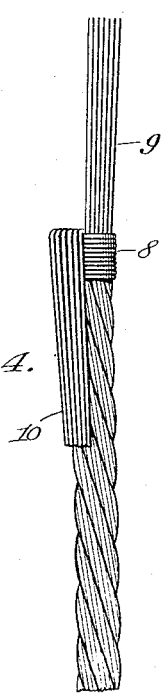
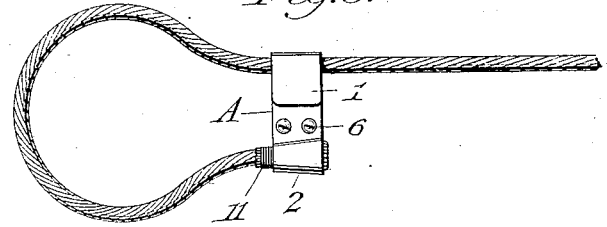
Inventor:
John J. A. Miller
G. Sargent Elliott.
Attorney.

Patented Feb. 10, 1931

1,791,631

UNITED STATES PATENT OFFICE

JOHN J. A. MILLER, OF DENVER, COLORADO

COMBINED CLAMP AND HOOK FOR CABLES AND ROPES

Application filed February 8, 1930. Serial No. 426,912.

My invention relates to a combined clamp and hook for cables and ropes.

The main object of the invention is to provide an improved hook and manner of securing the same upon the end or ends of a rope or cable, so that the said rope or cable can be used as a sling or a tow line or for other purposes.

Further, to provide a flat metal hook, one end of which is in the form of a tapered eye; in connection with a cable having a tapered enlargement on its end which is seated in the said eye, means being provided for clamping the eye upon the said enlargement, thereby to firmly secure the hook to the cable.

Further, to provide an improved method of forming the tapered enlargement on the end of the cable.

These objects are accomplished by the device illustrated in the accompanying drawings, in which:

Figure 1 is a side view of the improved hook, showing the same clamped upon the end portion of a cable.

Fig. 2 is a similar view of the opposite side of the hook.

Fig. 3 is a side edge view of the hook.

Fig. 4 is a side view of a portion of a cable, showing the manner of forming the tapered enlargement on the end of the same. And Fig. 5 is a view showing a short length of cable provided with the improved hook, the cable being passed under the hook to form a loop, as when the cable is used for a sling or a tow line.

Referring to the accompanying drawings:

The letter A refers to the improved hook which is formed of a flat metal strip of suitable dimensions, preferably about one inch and a quarter wide, an eighth of an inch thick, and of sufficient length to be bent upon itself to form a hook 1, on one end, and an eye 2 on its opposite end, the eye terminating in a flat bolt flange 3. The hook, however, may be made either larger or smaller to meet requirements. The eye 2 is tapered, as shown, and the bolt flange 3 is spaced from the adjacent side of the hook. The flange is provided with a pair of bolt holes 4, and bolt holes 5 are formed in the body of the hook in axial line with the holes 4. Bolts 6 are passed through these holes, and are provided with clamping nuts 7, which are adapted to be turned against the bolt flange to press the same toward or against the body of the hook, thereby to contract the diameter of the eye, as will later appear.

The cable shown in the drawings is five-sixteenths of an inch in diameter, but larger or smaller cable may be used to meet requirements. It is necessary to form a tapered enlargement on the end of the cable, which is adapted to be secured within the tapered eye of the hook, and this is accomplished in the following manner: A wire is wound several turns about the cable, and at a slightly greater distance from its end than the width of the hook, as shown at 8 in Fig. 4, and the ends of this wire may be secured to the cable by solder to prevent unwinding. The strands of the cable, from the winding 8 to its adjacent end, are then untwisted, to separate the individual wires of each strand, as shown at 9 in Fig. 4, and the individual strands are then bent down over the winding 8, and against the cable, as shown at 10, the said winding forming an annular enlargement on the cable, which causes the strands when folded back against the cable, to incline inward from their bending points to their free ends, so that, as a whole, they form a tapering enlargement. This enlarged end of a cable is then slipped into the eye of the hook which has previously been slipped on the cable, and the nuts 7 on the bolts 6 are turned against the bolt flange 3, thereby contracting the diameter of the opening in the eye 2, which is thus firmly clamped upon the said enlarged end of the cable. The end portions of the strands which extend beyond the smaller end of the eye are then wrapped with a few turns of wire, the ends of which are soldered to prevent unwinding, and this winding 11 prevents any possible inward slipping of the hook from the enlargement, while the combination of the tapered enlargement and the tapered eye which is clamped thereon, prevents any possible disconnection of the hook from the cable.

Having described my invention, what I claim as new and desire to secure by Letters Patent, is:

1. In a device of the character described, a cable, the strands of which, adjacent the end of the cable, are bent back upon themselves and against the cable to form an enlargement, a hook having a tapered eye to receive such enlargement, and means for contracting said eye and maintaining the same in clamping relation to said enlargement.

2. In a device of the character described, a cable, a wire wound about said cable adjacent the end thereof, the strands of said cable being bent back over said wound wire and against the cable to form a tapered enlargement, a hook having a tapered eye to receive said tapered enlargement, and means for contracting said eye and maintaining the same in clamping relation upon said enlargement.

3. In a device of the character described, a cable having a wire wound about the same adjacent the end thereof, the strands of said cable being bent back over said wound wire and against the cable to form a tapered enlargement; a hook, one end of which is bent to form a tapered eye which terminates in a bolt flange which is spaced from the body of the hook, said eye being adapted to receive the tapered enlargement on the cable, bolts which pass through said bolt flange and the body of the hook, and nuts on said bolt, thereby to contract said eye and maintain the same in clamping relation upon said enlargement.

4. In a device of the character described, a cable having a wire wound about the same adjacent the end thereof, the strands of said cable being bent back over said wound wire and against the cable to form a tapered enlargement, a hook having a tapered eye to receive said tapered enlargement, the ends of the strands which form said tapered enlargement extending beyond the smaller end of said eye, a wire which is wound about the said extending ends of said strands, and means for contracting said eye and maintaining the same in clamping relation upon said tapered enlargement.

In testimony whereof, I affix my signature.

JOHN J. A. MILLER.